United States Patent [19]

Matsuura et al.

[11] 4,324,876

[45] Apr. 13, 1982

[54] PROCESS FOR THE PRODUCTION OF POLYOLEFINS

[75] Inventors: Kazuo Matsuura; Takeichi Shiraishi; Etsuo Kawamata, all of Kawasaki; Nobuyuki Kuroda, Yokohama; Mitsuji Miyoshi, Kanagawa, all of Fed. Rep. of Germany

[73] Assignee: Nippon Oil Co., Ltd., Tokyo, Japan

[21] Appl. No.: 209,318

[22] Filed: Nov. 24, 1980

[30] Foreign Application Priority Data

Dec. 4, 1979 [JP] Japan .................. 54-157903

[51] Int. Cl.$^3$ .............. C08F 4/02; C08F 10/00
[52] U.S. Cl. ................ 526/124; 252/429 B; 252/429 C; 526/125; 526/352
[58] Field of Search ................ 526/124, 125

[56] References Cited

U.S. PATENT DOCUMENTS

| | | | |
|---|---|---|---|
| 3,658,722 | 4/1972 | Delbouille et al. ............ | 252/429 C |
| 3,676,415 | 7/1972 | Diedrich et al. ............... | 260/88.2 |
| 3,819,599 | 6/1974 | Fotis et al. .................... | 526/124 |
| 3,888,835 | 6/1975 | Ito et al. ....................... | 526/125 |
| 3,953,414 | 4/1976 | Galli et al. .................... | 526/125 |
| 4,111,835 | 9/1978 | Foschini et al. ............... | 526/125 |

FOREIGN PATENT DOCUMENTS

| | | | |
|---|---|---|---|
| 2839188 | 3/1979 | Fed. Rep. of Germany ...... | 526/124 |
| 51-13193 | 4/1976 | Japan . | |
| 1305610 | 2/1973 | United Kingdom ............... | 526/125 |

*Primary Examiner*—Edward J. Smith
*Attorney, Agent, or Firm*—Hill, Van Santen, Steadman, Chiara & Simpson

[57] ABSTRACT

A process for the homopolymerization or copolymerization of olefins is disclosed. The process is carried out in the presence of a catalyst system comprising the combination of an organometallic compound with a component resulting from the mutual contact of (i) an inorganic magnesium compound of a spherical shape having an average particle size of from 1 to 100 microns; (ii) a compound represented by the formula AlX$_3$·OR'R'' (where X represents a halogen atom, and R' and R'' represent a hydrocarbon residual group having 1 to 20 carbon atoms; and (iii) a titanium compound represented by the formula Ti(OR)$_4$ (where R represents a hydrocarbon residual group having 1 to 20 carbon atoms). The resulting polymers are provided with a spherical particle shape.

5 Claims, No Drawings

PROCESS FOR THE PRODUCTION OF POLYOLEFINS

BACKGROUND OF THE INVENTION

1. Field of the Invention

This invention relates to a process for producing polyolefins. More particularly, the invention is concerned with the homopolymerization or copolymerization of olefins which is effected in the presence of a catalyst system comprising the combination of an organometallic compound with a component resulting from the mutual contact of (i) an inorganic magnesium compound of a spherical shape having an average particle size of from 1 to 100 microns; (ii) a compound represented by the formula $AlX_3.OR'R''$ (where X represents a halogen atom, and R' and R'' represent a hydrocarbon residual group having 1 to 20 carbon atoms; and (iii) a titanium compound represented by the formula $Ti(OR)_4$ (where R represents a hydrocarbon residual group having 1 to 20 carbon atoms).

2. Prior Art

In this field of technology, there are known a number of catalysts in which a compound of a transition metal such as titanium, vanadium and the like is carried on a solid inorganic magnesium compound such as magnesium halide, magnesium oxide, magnesium hydroxide and the like. Polymers obtained with use of such catalysts, however, are not satisfactory in that they differ in the shape of polymer particles, their bulk density is generally small, their powder fluidity is poor, and their particle size distribution is generally broad, on account of which the polymer contains a large portion of minute powder particles. Much therefore has been to be desired for improved productivity and slurry handling. When such conventional polymers are subjected to forming process, there often arise such problems as associated with dusts and declined efficiency and performance at the time of the molding or fabrication.

The present inventors already proposed in Japanese Patent Publication No. 51-13193 a catalyst system prepared by combining a catalyst component obtained by mixing and heating an inorganic magnesium compound, a compound represented by the formula $AlX_3.OR'R''$ (where X represents a halogen atom, and R' and R'' respectively represent an alkyl group or aryl group having 1 to 4 carbon atoms) and a halogenated compound of titanium and/or vanadium, with an organoaluminum compound and/or an organozinc compound. As will be seen from comparative examples to appear later, it has been still difficult to eliminate the foregoing problems even with the use of the spherical inorganic magnesium compound of the present invention in place of the inorganic magnesium compound of the prior catalyst system.

SUMMARY OF THE INVENTION

It is therefore an object of the present invention to provide substantial increases in the yield of polymers per solid catalyst as well as in the yield of polymers per transition metal, with the results that the step of removing the catalyst residue in the polymer can be dispensed with; that polymers of a spherical shape having a high bulk density and good powder fluidity can be obtained; and further that a fine powdery portion of the polymer can be reduced because of the very narrow range of particle size distribution.

DETAILED DESCRIPTION OF THE PREFERRED EMBODIMENTS

The component (i) to be used in the present invention is an inorganic magnesium compound having a substantially spherical particle shape and an average particle size of from 1 to 100 microns. Although there is no particular limitation imposed on the method of preparing such inorganic magnesium compound, the spray-granulating method as for example can be preferably adopted. Typical examples of such inorganic magnesium compound include $MgCl_2$, $MgO$, $Mg(OH)_2$, $MgCO_3$ and $MgSO_4$ of which $MgO$ and $Mg(OH)_2$ are particularly preferable. There may also be used various double oxides of Mg and other metals such as, for example, $MgO.SiO_2$, $MgO.Al_2O_3$ and hydrotalcite. It is to be noted here that the above formulas are not molecular formulas, but only representative of the composition. Hence, the chemical structure and component ratio of these double oxides are not particularly limitative. These inorganic magnesium compounds may of course include their anhydrides and hydrates and may also contain some moisture, combined water, or hydroxyl group.

The component (ii), i.e. aluminum trihalide etherate represented by the general formula $AlX_3.OR'R''$ (where X represents a halogen atom, and R' and R'' represents a hydrocarbon residual group having 1 to 20 carbon atoms, more preferably an alkyl group or aryl group having 1 to 4 carbon atoms) includes aluminum trifluoride dimethyl etherate, aluminum trifluoride diethyl etherate, aluminum trifluoride diisopropyl etherate, aluminum trifluoride dibutyl etherate, aluminum trifluoride methylethyl etherate, aluminum trichloride dimethyl etherate, aluminum trichloride diethyl etherate, aluminum trichloride methylethyl etherate, aluminum trichloride dibutyl etherate, aluminum trichloride diamyl etherate, aluminum trichloride diallyl etherate, aluminum tribromide dimethyl etherate, aluminum tribromide diethyl etherate, aluminum triiodide dimethyl etherate and aluminum triiodide diethyl etherate.

The component (iii), i.e. titanium compound represented by the general formula $Ti(OR)_4$ (where R represents a hydrocarbon residual group having 1 to 20 carbon atoms) includes titanium tetramethoxide, titanium tetraethoxide, titanium tetraisopropoxide, titanium tetra-n-propoxide, titanium tetra-n-butoxide, titanium tetra-sec-butoxide, titanium tetra-t-butoxide, titanium tetra-n-pentoxide, titanium tetra-n-octoxide and titanium tetraphenoxide.

There may be considered various methods for mutually contacting the components (i), (ii) and (iii). Preferably, the components (i) and (ii) are first contacted with each other and thereafter with the component (iii), or alternatively the components (i), (ii) and (iii) are all simultaneously brought into mutual contact in a well known manner in the presence or absence of an inert solvent and at a temperature of from 50° to 300° C., or preferably 100° to 150° C. The reaction time is not particularly limited, and it is usually 5 minutes or longer or even as long as 10 hours. Another alternative method of contact is co-pulverization which should be carried out in an inert gas atmosphere with moisture held to an absolute minimum. Apparatus for effecting co-pulverization may be a ball mill, vibration mill, rod mill, impact mill or the like. Temperature, time and other operating conditions may be determined by those skilled in the art depending upon the particular apparatus employed.

The temperature usually ranges from 0° C. to 200° C., or preferably from 20° C. to 100° C., and the time from 0.5 to 50 hours, or preferably from 1 to 30 hours.

The component (iii) may be used in some excess but may usually be used in an amount of from 0.001 to 50 times greater in weight than that of the component (i). Any excess titanium compound should be removed by washing in a solvent after it has been mixed and heated. Removal of unreacted titanium compound after completion of the reaction may be effected by washing several times in a solvent which is inert to the Ziegler catalyst, with the washing liquid evaporated at reduced pressure to obtain a solid powder.

The amount of the titanium compound should most preferably be adjusted such that the titanium content in the solid catalyst component may be within the range of from 0.5 to 20 percent by weight, a range of from 1 to 10 weight percent being particularly preferred for obtaining a well balanced polymerization activity per titanium or per solid catalyst component.

The ratio of the inorganic magnesium compound or the component (i) to the aluminum trihalide etherate or the component (ii) is usually 1 gram to 0.05–10 milli-mol or more preferably to 0.1–5 milli-mol.

The organometallic compound contemplated by the present invention may be those of metals belonging to the Group I to IV metals in the Periodic Table which are known as one component of the Ziegler catalyst and preferably includes organoaluminum compounds and organozinc compounds. Examples of these organometallic compounds are organoaluminum compounds represented by the general formula $R_3Al$, $R_2AlX$, $RAlX_2$, $R_2AlOR$, $RAl(OR)_2$, $RAl(OR)X$, and $R_3Al_2X_3$ (where R represents alkyl group or aryl group having 1 to 20 carbon atoms, which may be the same or different; and X represents a halogen atom), and organozinc compounds represented by the general formula $R_2Zn$ (where R represents alkyl group having 1 to 20 carbon atoms, which may be either identical or different). Examples of these compounds include triethylaluminum, tri-isobutylaluminum, trihexylaluminum, trioctylaluminum, tridecylaluminum, diethylaluminum chloride, ethylaluminum sesquichloride, ethoxydiethylaluminum, diethylzinc and mixtures thereof. The organometallic compounds may usually be used in an amount of from 0.1 to 1,000 mols with respect to the titanium compound.

The polymerization reaction of olefins using the catalyst of the present invention is conducted in the presence or absence of an inert solvent in a slurry condition or a gas phase in a manner similar to the polymerization of olefins using the Ziegler catalyst, wherein the reaction is carried out substantially without oxygen and water. Reaction temperature ranges from 20° to 300° C., more preferably from 50° to 180° C., most preferably from 50° to 120° C. Reaction pressure ranges from atmospheric to 70 kg/cm² or more preferably from 2 to 60 kg/cm². Molecular weight of the reaction product can be adjusted to some extent by varying the polymerization temperature or the mol ratio of the catalyst but more effectively by adding hydrogen to the polymerization system. Two or more multi-stage polymerization reactions, differing in hydrogen concentration, polymerization temperature or other reaction conditions may also be employed for the catalyst of the invention.

The process of the present invention is applicable to the polymerization of all olefins, especially α-olefins having 1 to 12 carbon atoms that can be polymerized with use of the Ziegler catalyst, for example the homopolymerization of α-olefins such as ethylene, propylene and 1-butene and the copolymerization of ethylene and propylene, ethylene and 1-butene, propylene and 1-butene. It can also be applied to the copolymerization with dienes for reforming polyolefins such as of ethylene and butadiene, and ethylene and 1,4-hexadiene.

The invention will be further described with reference to the following examples which are only illustrative, not limiting.

EXAMPLE 1

(a) Preparation of Solid Catalyst Component 10 grams of spherical magnesium hydroxide having an average particle size of 50 microns was dried for one hour in vacuum at 150° C. Subsequently, 50 milliliters of hexane was added to suspend magnesium hydroxide in hexane, to which 5 milliliters of aluminum trichloride diethyl etherate was added, and the batch was agitated for two hours under a hexane reflux. Hexane was thereafter removed in vacuum, and 50 milliliters of titanium tetrabutoxide was added, and the reaction was continued for one hour at a temperature of 130° C. After termination of the reaction, the reaction product was washed with hexane until no titanium tetrabutoxide could be traced in the washing liquid, thereby obtaining a solid catalyst component.

(b) Polymerization

A stainless steel autoclave of a 2-liter capacity equipped with an induction agitator was purged with nitrogen, and then 1,000 milliliters of hexane was introduced into it. 1 milli-mol of triethylaluminum and 100 milligrams of the above solid catalyst component were added. While the batch was being agitated, the temperature was elevated to 85° C. Under the vapor pressure of hexane, the reaction system showed a pressure of 1.7 kg/cm².G. The system was charged with hydrogen to a total pressure of 6 kg/cm².G, and subsequently ethylene was charged to a total pressure of 10 kg/cm².G, whereupon the polymerization was initiated. The polymerization was continued for three hours with continuous charge of ethylene to make a total pressure of 10 kg/cm².G. After termination of the polymerization, the polymeric slurry was decanted into a beaker, and hexane was removed in vacuum, whereby there was obtained 50 grams of white polyethylene having a melt index of 4.5 and a bulk density of 0.33. The catalytic activity was represented by 500 grams of polyethylene per 1 gram of the solid catalyst. An average particle size of the polymer was 400 microns, and its particle shape was spherical.

Comparative Example 1

The procedure of Example 1 was followed with the exception that aluminum trichloride diethyl etherate in Example 1 was not used, whereby 2 grams of polyethylene was obtained. The catalytic activity was only 20 grams of polyethylene per 1 gram of the solid catalyst.

Comparative Example 2

The polymerization was conducted in the same manner as in Example 1 above with the exception that titanium tetrachloride was used in place of titanium tetrabutoxide, whereby 60 grams of polyethylene having a melt index of 0.24 and a bulk density of 0.23 was obtained. Fleece was observed on the surface of the polymer powder which had a low bulk density, and a low powder fluidity.

Comparative Example 3

The polymerization was conducted in the same manner as in Example 1 above with the exception that amorphous magnesium hydroxide was used in place of spherical magnesium hydroxide, whereby 42 grams of polyethylene having a melt index of 2 was obtained. The average particle size of the resulting polyethylene was 200 microns, and its bulk density was 0.19. The shape of polymer particles was heterogeneous, and its powder fluidity was low.

EXAMPLE 2

The polymerization was conducted in the same manner as in Example 1 above with the exception that diethylaluminium chloride was used in place of triethylaluminum, whereby 70 grams of white polyethylene having a melt index of 0.08 and a bulk density of 0.35 was obtained. The catalytic activity was represented by 700 grams of polyethylene per 1 gram of the solid catalyst. The average particle size of the polymer powder was 450 microns. The shape of the powder particles was truly spherical.

EXAMPLE 3

The polymerization was conducted in the same manner as in Example 1 with the exception that triethylaluminum and diethylaluminum chloride (in a mol ratio of 1:1) were used in place of triethylaluminum alone whereby 170 grams of white polyethylene having a melt index of 5 and a bulk density of 0.40 was obtained. The catalytic activity was represented by 1,700 grams of polyethylene per 1 gram of the solid catalyst. The average particle size of the polymer powder was 500 microns and the particle was of a true spherical shape. The polymer particles had high powder fluidity.

EXAMPLE 4

The polymerization was conducted in the same manner as in Example 1 with the exception that spherical magnesium oxide having an average particle size of 48 microns was used in place of magnesium hydroxide and titanium tetraisopropoxide in place of titanium tetrabutoxide, whereby 60 grams of white polyethylene having a melt index of 3 and a bulk density of 0.34 was obtained. The catalytic activity was represented by 600 grams of polyethylene per 1 gram of the solid catalyst. The polymer powder particles were in a spherical shape and had an average particle size of 450 microns.

EXAMPLE 5

The polymerization was conducted in the same manner as in Example 1 with the exception that spherical hydroxy magnesium chloride having an average particle size of 58 microns was used in place of magnesium hydroxide and aluminum trichloride dibutyl etherate in place of aluminum trichloride diethyl etherate, whereby 55 grams of white polyethylene having a melt index of 4 and a bulk density of 0.34 was obtained. The catalytic activity was represented by 550 grams of polyethylene per 1 gram of the solid catalyst. The average particle size of the polymer powder was 410 microns. The shape of the polymer particles was spherical.

Comparative Example 4

The polymerization was conducted in the same manner as in Example 5 above with the exception that no aluminum trichloride dibutyl etherate was used, whereby only 1 gram polyethylene was obtained. The catalytic activity thereof was remarkably poor.

EXAMPLE 6

The polymerization was conducted in the same manner as in Example 1 with the exception that a composite compound of spherical magnesium oxide having an average particle size of 60 microns and aluminum oxide was used in place of magnesium hydroxide, whereby 58 grams of white polyethylene having a melt index of 3.5 and a bulk density of 0.34 was obtained. The catalytic activity was represented by 550 grams of polyethylene per 1 gram of the solid catalyst. The average particle size of the polymer powder was 460 microns. The shape of the particles was spherical.

What is claimed is:

1. A process for the production of polyolefins which comprises polymerizing or copolymerizing olefins at a temperature of from 20° C. to 300° C. and a pressure of atmospheric to 70 kg/cm$^2$ in the presence of a catalyst system comprising a solid component and an organometallic compound, said solid component resulting from the mutual contact of
    (i) an inorganic magnesium compound selected from the group consisting of MgO, Mg(OH)$_2$, MgCO$_3$, MgSO$_4$, MgO.SiO$_2$, MgO.Al$_2$O$_3$ and hydrotalcite of a spherical particle size of from 1 to 100 microns,
    (ii) a compound represented by the formula AlX$_3$.OR'R" where X represents a halogen atom; and R' and R" represent a hydrocarbon residual group having 1 to 20 carbon atoms) and
    (iii) a titanium compound represented by the formula Ti(OR)$_4$ (where R represents a hydrocarbon residual group having 1 to 20 carbon atoms), at a temperature of from 50° C. to 300° C., the ratio of inorganic magnesium compound (i) to compound (ii) being 1 gram to 0.05 to 10 milli-mols, and the amount of titanium compound in said solid component being from 0.5 to 20% by weight,
and said organometallic compound being a compound of a metal of the Groups I to IV of the Periodic Table.

2. A process as claimed in claim 1 wherein said compound (ii) is selected from the group consisting of aluminum trifluoride dimethyl etherate, aluminum trifluoride diethyl etherate, aluminum trifluoride diisopropyl etherate, aluminum trifluoride dibutyl etherate, aluminum trifluoride methylethyl etherate, aluminum trichloride dimethyl etherate, aluminum trichloride diethyl etherate, aluminum trichloride methylethyl etherate, aluminum trichloride dibutyl etherate, aluminum trichloride diamyl etherate, aluminum trichloride diallyl etherate, aluminum tribromide dimethyl etherate, aluminum tribromide diethyl etherate, aluminum triiodide dimethyl etherate and aluminum triiodide diethyl etherate.

3. A process as claimed in claim 1 wherein said titanium compound (iii) is selected from the group consisting of titanium tetramethoxide, titanium tetraethoxide, titanium tetraisopropoxide, titanium tetra-n-propoxide, titanium tetra-n-butoxide, titanium tetra-sec-butoxide, titanium tetra-t-butoxide, titanium tetra-n-pentoxide, titanium tetra-n-octoxide and titanium tetraphenoxide.

4. A process as claimed in claim 1 wherein the ratio of the inorganic magnesium compound to aluminum trihalide etherate is 1 gram to 0.1–5 milli-mol.

5. A process as claimed in claim 1 wherein the amount of the titanium compound contained in the solid component is within the range of from 1 to 10 percent by weight.

* * * * *